United States Patent [19]

Jones

[11] 4,169,823

[45] Oct. 2, 1979

[54] COATING COMPOSITION COMPRISING AN AQUEOUS EMULSION OF POLYETHYLENE CONTAINING A WATER-SOLUBLE POLYETHYLENE OXIDE

[75] Inventor: James C. Jones, Maumee, Ohio

[73] Assignee: Owens-Illinois, Inc., Toledo, Ohio

[21] Appl. No.: 915,622

[22] Filed: Jun. 14, 1978

[51] Int. Cl.$^2$ .............................................. C08L 23/06
[52] U.S. Cl. .................. 260/29.6 NR; 260/29.6 ME; 428/441; 428/513
[58] Field of Search .............. 260/29.6 NR, 29.6 ME; 428/441, 513

[56] References Cited

U.S. PATENT DOCUMENTS

| | | | |
|---|---|---|---|
| 2,995,533 | 8/1961 | Parmer et al. | 260/23 |
| 3,112,282 | 11/1963 | Jones et al. | 260/29.6 ME |
| 3,226,352 | 12/1965 | Helin et al. | 260/29.6 ME |
| 3,268,464 | 8/1966 | Suter | 260/24 |
| 3,422,049 | 1/1969 | McClain | 260/29.6 NR |
| 3,432,339 | 3/1969 | Howell et al. | 117/132 |
| 3,457,100 | 7/1969 | Levene | 427/391 |
| 3,477,862 | 11/1969 | Forsyth | 260/37 AL |
| 3,625,715 | 12/1971 | Nasca | 106/2 |
| 3,950,293 | 4/1976 | Sander et al. | 260/29.6 NR |
| 4,014,833 | 3/1977 | Story | 260/22 CQ |

*Primary Examiner*—Maurice J. Welsh
*Attorney, Agent, or Firm*—Steve M. McLary; Myron E. Click; David H. Wilson

[57] ABSTRACT

A coating composition for imparting improved scuff resistance to a substrate and a process for its use are disclosed. The coating composition comprises an aqueous emulsion of polyethylene containing from about 0.5% to about 15% of a water-soluble polyethylene oxide by weight of the polyethylene emulsion. The preferred substrate is a paper product such as paper, paperboard and linerboard.

12 Claims, No Drawings

COATING COMPOSITION COMPRISING AN AQUEOUS EMULSION OF POLYETHYLENE CONTAINING A WATER-SOLUBLE POLYETHYLENE OXIDE

BACKGROUND OF THE INVENTION

Substrates of various kinds are often subjected to abrasion and scuffing. As an instance, paper, paperboard and linerboard products are commercially used in the manufacture of containers such as setup boxes, folding cartons, fiber cans and tubes, corrugated and solid fiber boxes, drums, etc. Paperboard and like products have a tendence to form quills or peels when subjected to scuffing or rubbing, as in passing through a corrugator, on a conveyor system, or in freight cars when one box rubs against another. Also, during shipment, an article of manufacture within a container often strikes the paperboard such that it surface becomes marked. The coarse, relatively abrasive surface of the container inflects wear spots, scuffs, scratches, and other undesirable flaws on the surface of the article. Under such conditions, the shipped article has to be repaired or resurfaced prior to sale. This problem is particularly acute with items such as clothes, bowling balls, furniture, appliances and the like.

Attempts have been made to make paper, paperboard and linerboard anti-abrasive to avoid marring contents of a box as well as scuff resistant to avoid being marked itself. Drying-oil coatings, cooked varnishes, and solutions of natural gums in suitable solvents have been applied to such products for adding scuff resistance. These coatings are generally hard, brittle, adversely affected by temperature and humidity, and are inclined to be tacky and malodorous. Other attempts have applied certain compounds to paperboard so as to impart a non-abrasive surface to it. While achieving limited non-abrasive qualities, these coatings imparted other undesirable properties to the paperboard. By way of illustration, glycerin has been used to impart a non-abrasive surface. However, glycerine decreases the strength of the board, increases its water absorbance, and imparts an objectionable damp feel. Likewise, prior non-abrasive coating compounds, such as sodium oleate, exhibit poor aging qualities with the inherent result that the coated board often developes an objectionable odor. Wax has also been used, but a wax coating tends to wear away easily and detrimentally affect the surface. Still other proposed coatings have been difficult and expensive to apply and are often ineffective for the intended purpose. The disadvantages of their use outweigh their advantages.

In U.S. Pat. No. 3,457,100 to Levene, a process for increasing the scuff-resistance of paperboard is disclosed which comprises essentially a two-step process. Initially, paper or paperboard is treated with a solution of a tin compound in an organic solvent, such as a stannic halide in an aliphatic hydrocarbon, and then subsequently coated with an aqueous emulsion of polyethylene.

Polyethylene oxide has been used in inks to improve the flow or transfer of the inks. For example, U.S. Pat. No. 3,477,862 to Forsyth, Jr. discloses an ink comprising a dyestuff, a solution of polyethylene oxide, and glycerine for use in a pen, nozzle, or other ink applying means to insure inscription of clear, continuous solid line. U.S. Pat. No. 4,014,833 to Story describes improving the ink transfer properties of an aqueous printing ink by incorporating polyethylene oxide in the ink.

SUMMARY OF THE INVENTION

The principal object of the present invention is to provide an improved coating composition for a substrate, which may include any suitable supporting surface such as glass, floors, etc., but which desirably is a paper product such as paper, paperboard, linerboard, and the like.

Related objects are to provide a coating composition that eliminates the need for the pre-application of a metal compound, such as a tin compound, that eliminates the need for volatile organic solvents, and that requires only a single application step to achieve the improved scuff resistance.

It has now been discovered that an initial application of a metal compound like a tin compound and the use of an organic solvent for such compound, as in the cited patent to Levene, can be entirely eliminated if metal-free polyethylene oxide is added directly to the aqueous emulsion of polyethylene, and the resultant emulsion is applied to the substrate in a single step.

In one form, the coating composition comprises an aqueous emulsion of polyethylene containing from about 0.5% to about 15% of a water-soluble polyethylene oxide by weight of the polyethylene emulsion. The present coating compositions may be applied to a substrate by several means, such as by roller application.

DESCRIPTION OF THE PREFERRED EMBODIMENTS

The present coating compositions comprise an aqueous emulsion of polyethylene to which an effective amount of polyethylene oxide has been added. The emulsion presently preferred is an aqueous emulsion containing polyethylene commercially designated as AC Polyethylene, Product No. 629, and distributed by the Semet-Solvay Division of Allied Chemical and Dye Corporation.

By way of illustration, such an emulsion may be prepared by melting in parts by weight 40 parts of low molecular weight polyethylene having an average molecular weight of approximately 120 to 2000 and an acid number of 14 to 17, and adding 11 parts of a fatty acid such as oleic, palmitic, stearic, or lauric acids or mixtures thereof. Two parts of an aqueous solution of an alkali metal hydroxide are then added to the mixture while it is at a temperature of about 230° F. to 245° F., followed by addition of 207 parts of water. The fatty acid and alkali metal hydroxide form a soap which acts as an emulsifying agent. Many other emulsifying agents known in the art may be used in place of such a soap emulsifier. The polyethylene has a particle size of less than 10 microns, usually from 1 to 5 microns, and comprises a solid content of about 20% by weight of the emulsion.

The resulting emulsion can be further diluted with distilled water or srengthened by the addition of more of the same polyethylene so as to form an emulsion containing from about 1% to about 25% by weight of polyethylene, as may be desired.

The polyethylene oxide which may be used is homopolymer, commercially available from Union Carbide under the trade designation, POLYOX WSR N-80. Rheological measurements indicate that one resin used had a relatively narrow distribution of molecular weights and an average molecular weight of about 200,000. The viscosity range, at 25° C., for this product, using a Brookfield spindle No. 1, 50 revolutions per minute, was given as 81 to 105 cps for a five percent solution. Polyethylene oxide polymers are linear resins that may be characterized by a relatively large number of polar groups in the molecule. Such polyethylene polymers can be prepared by polymerizing ethylene oxide in contact with a catalyst, such as alkaline earth amide or hexammoniates, as is known in the polymer art.

Polyethylene oxides useful in the present invention are those which, prior to dissolution in the polyethylene emulsion, have average molecular weights in the range of 100,000 up to that at which the polyethylene oxide is no longer water soluble. As a rule, the molecular weight may range from about 100,000 to about 1,000,000 and preferably is about 200,000. The polyethylene oxide can be present in an amount of from about 0.5% to about 15% by weight of the polyethylene emulsion. Desirably, the polyethylene oxide is present in an amount of from about 0.5% to about 1% and preferably about 0.7% for a 25% polyethylene emulsion.

The polyethylene oxide is dissolved as a powder in water to prepare approximately a 1% to about a 10% by weight solution and preferably about a 6% solution. The polyethylene oxide solution is then mixed with the polyethylene emulsion in proportions needed to obtain an aqueous mix of about 1% to about 25% by weight of the polyethylene and about 0.5% to about 15% of the polyethylene oxide.

The emulsion of polyethylene containing in solution the polyethylene oxide can be applied to a substrate by any suitable means as dipping, spraying, knife coating, roller coating, air coating, extrude coating, and the like. The best mode of application is by flexographic printing known in the art by which the coating compositions are especially suited for production line application. After applying the emulsion to a substrate, the assembly can be suitably dried in air or by slight warming to remove the water. The thickness of the resulting coating may vary widely to meet diverse requirements. As a rule, the coating may range from about 0.25 pound to about 3 pounds per thousand square feet of substrate on a dry basis.

Use of the present coating compositions measurably improves the scuff resistance of a substrate and especially of paper products like paper, paperboard, and linerboard. In addition, the coating compositions eliminate or substantially decrease a dusting problem which is often met during shipment of paperboard cartons and which results from friction and abrasion of interior surfaces of paperboard and linerboard containers against the contents of the containers.

The following examples are intended only to illustrate the invention and should not be construed to impose limitations on the claims.

COMPARATIVE EXAMPLES

Comparative dusting and scuff tests were carried out on paperboard coated with colloidal silica and on paperboard coated with a present coating composition. The testing equipment used was an S and S Scuff Tester, a machine known in the testing art and especially designed for testing paper and paper products. The machine consisted of a stationary plate on which a specimen of paper or other paper product is mounted and a reciprocating plate on which another specimen of the same paper or product is mounted. Thus, the specimens of the two plates are of exactly the same material and one cannot cause greater abrasion of the other. The reciprocating plate moves through a defined stroke to rub its paper product against the paper product of the stationary plate with a predetermined abrasive force.

Each trip of the reciprocating plate constitutes a cycle which is counted. Periodically, after a certain number of cycles, the machine is halted to inspect the condition of the paper product under test. By visual observance, a tester determines first when dusting begins and then when significant scuffing has occurred to constitute scuff failure, noting the number of cycles of the machine at each juncture.

In these examples, paperboard was tested. A control was used in which the paperboard was coated with a 20% by weight aqueous solution of colloidal silica and then dried. The colloidal silica used was purchased under the trademark Ludox. Another paperboard was coated with a present coating composition consisting essentially of an aqueous emulsion of about 20% by weight of polyethylene and containing in solution about 5% by weight of polyethylene oxide. For each test, the coating composition was applied to the paperboard at a rate of about 1.6 pounds per thousand square feet on a dry basis. Table A lists the results.

TABLE A

| Example | 1 | 2 |
|---|---|---|
| Coating | Control-Silica | Polyethylene and Polyethylene Oxide |
| Coefficient of Friction | 0.65 at 33° incline | 0.25 at 14° incline |
| Scuff Dusting (cycles) | 6 | 42 |
| Scuff Failure (cycles) | 50 | * |

*Testing terminated after 500 cycles with no failure

The coefficients of friction given were measured at the degree of plane indicated. Paperboard having the central coating began to dust early after only six cycles, whereas paperboard having the present coating composition did not begin to dust until much later at 42 cycles. It is usual for dusting to begin at about 10 cycles. Similarly, the control failed the scuff test at 50 cycles, while the present coating composition had not failed even at 500 cycles when the test was halted.

Although the foregoing describes several preferred embodiments of the present invention, it is understood that the invention may be practiced in still other forms within the scope of the following claims.

I claim:

1. A coating composition for a substrate adapted to improve the scuff resistance of the substrate, said composition comprising an aqueous emulsion of a polyethylene containing from about 0.5% to about 15% of a homopolymer consisting essentially of a water-soluble polyethylene oxide by weight of said polyethylene emulsion, said polyethylene oxide prior to dissolution in said aqueous emulsion having an average molecular weight of about 100,000 to a molecular weight at which the polyethylene oxide is no longer water soluble, said polyethylene and polyethylene oxide being adapted to be co-deposited from said aqueous emulsion jointly to form a coating on such substrate having improved scuff resistance.

2. The coating composition of claim 1 in which said aqueous emulsion contains from about 1% to about 25% by weight of said polyethylene.

3. The coating composition of claim 1 in which said polyethylene has an average molecular weight of about 1200 to about 2000.

4. The coating composition of claim 1 in which said aqueous emulsion contains from about 1% to about 25% by weight of said polyethylene, said polyethylene has an average particle size of less than 10 microns and an average molecular weight of about 1200 to about 2000, and said polyethylene oxide prior to dissolution in said aqueous emulsion has an average molecule weight of about 100,000 to about 1,000,000.

5. The coating composition of claim 1, in which said substrate is paper, paperboard or linerboard.

6. The coating composition of claim 1 in which said substrate is glass.

7. A process for treating a substrate to improve its scuff resistance, comprising applying to said substrate an effective amount of a coating composition comprising an aqueous emulsion of polyethylene containing from about 0.5% to about 15% of a homopolymer consisting essentially of a water-soluble polyethylene oxide by weight of said polyethylene emulsion, said polyethylene oxide prior to dissolution in said aqueous emulsion having an average molecular weight of about 100,000 to a molecular weight at which said polyethylene oxide is no longer water soluble, removing the water of said emulsion to co-deposit on said substrate a solid coating having improved scuff resistance and containing both of said polyethylene and said polyethylene oxide.

8. The process of claim 7 in which said aqueous emulsion contains from about 1% to about 25% by weight of said polyethylene.

9. The process of claim 7 in which said polyethylene has an average molecular weight of about 1200 to about 2000.

10. The process of claim 7 in which said aqueous emulsion contains from about 1% to about 25% by weight of said polyethylene, said polyethylene has an average particle size of less than 10 microns and an average molecular weight of about 1200 to about 2000, and said polyethylene oxide prior to dissolution in said aqueous emulsion has an average molecular weight of about 100,000 to about 1,000,000.

11. The process of claim 7 in which said substrate is paper, paperboard or linerboard.

12. The process of claim 7 in which said substrate is glass.

* * * * *